US011391588B2

(12) United States Patent
Heinisch et al.

(10) Patent No.: US 11,391,588 B2
(45) Date of Patent: Jul. 19, 2022

(54) USING BIG DATA TO NAVIGATE VEHICLES AT LARGE EVENTS

(71) Applicant: Toyota Motor North America, Inc., Plano, TX (US)

(72) Inventors: Gunnar Heinisch, McKinney, TX (US); Mohan Kusgur, Plano, TX (US); Robert Douglas, Frisco, TX (US); Evan Vijithakumara, Frisco, TX (US); Alex Pham, San Jose, CA (US); Nutonya Lynn Parker, Dallas, TX (US); Sriranjan Tadimari, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 452 days.

(21) Appl. No.: 16/557,856

(22) Filed: Aug. 30, 2019

(65) Prior Publication Data

US 2021/0063184 A1    Mar. 4, 2021

(51) Int. Cl.
*G01C 21/34* (2006.01)
*G08G 1/14* (2006.01)
*G08G 1/052* (2006.01)
*G08G 1/01* (2006.01)

(52) U.S. Cl.
CPC ....... *G01C 21/3492* (2013.01); *G08G 1/0125* (2013.01); *G08G 1/052* (2013.01); *G08G 1/14* (2013.01)

(58) Field of Classification Search
CPC .. G01C 21/3492; G08G 1/0125; G08G 1/052; G08G 1/14

USPC ......................................................... 701/119
See application file for complete search history.

(56) References Cited

U.S. PATENT DOCUMENTS

| | | |
|---|---|---|
| 7,164,986 B2 | 1/2007 | Humphries et al. |
| 8,090,530 B2 | 1/2012 | Horvitz |
| 9,435,657 B2 | 9/2016 | Feng |
| 9,671,230 B2 | 6/2017 | Sahay et al. |
| 9,677,901 B2 | 6/2017 | Yamamoto |
| 10,061,314 B2 | 8/2018 | Miller |
| 10,278,154 B2 | 4/2019 | Ronen |
| 2012/0065871 A1 | 3/2012 | Desphande et al. |
| 2013/0268195 A1 | 10/2013 | Tai et al. |
| 2015/0112593 A1 | 4/2015 | Kandangath et al. |
| 2015/0192422 A1 | 7/2015 | Adam et al. |
| 2016/0241997 A1 | 8/2016 | Lucas |
| 2018/0107216 A1 | 4/2018 | Beaurepaire et al. |
| 2018/0283889 A1 | 10/2018 | Koo et al. |

(Continued)

*Primary Examiner* — Peter D Nolan
*Assistant Examiner* — Luke Huynh
(74) *Attorney, Agent, or Firm* — Snell & Wilmer LLP

(57) ABSTRACT

Methods, systems, and apparatus for an event navigation system. The event navigation system includes a sensor configured to monitor traffic flow within a first structure. The event navigation system includes a memory configured to store a map of the first structure. The event navigation system includes a processor coupled to the sensor and the memory. The processor is configured to obtain a current location of a user and a destination location for the user. The processor is configured to determine a route from the current location to the destination location based on the map of the first structure, the current location, the destination location and the traffic flow within the first structure. The processor is configured to provide the route to the user.

22 Claims, 5 Drawing Sheets

(56) References Cited

U.S. PATENT DOCUMENTS

| | | | |
|---|---|---|---|
| 2018/0349413 A1* | 12/2018 | Shelby | G01C 21/3415 |
| 2019/0056233 A1 | 2/2019 | Liu et al. | |
| 2019/0234743 A1* | 8/2019 | Roy | H04W 4/20 |
| 2020/0050894 A1* | 2/2020 | Park | H04W 4/33 |
| 2021/0055122 A1* | 2/2021 | Pham | G08G 1/096838 |

* cited by examiner

USING BIG DATA TO NAVIGATE VEHICLES AT LARGE EVENTS

BACKGROUND

Field

The present disclosure relates to systems and methods for navigating vehicles and/or users at large events.

Description of the Related Art

There are generally multiple exits and entrances at structures or lots that hold large events, such as coliseums, theaters, arenas, parking garages, parking lots and/or other large structures or lots. During an event, many of these exits, entrances or routes to the exits or entrances may be closed to direct or control traffic flow. Moreover, the traffic flow to these exits and/or entrances may vary before, after and/or during the large event. When a person enters the structure or lot and goes to their seat and/or when the person leaves their seat, structure or lot to go home, the person may meet delays, obstructions and traffic when entering or exiting the structure. A typical navigation system does not help a user to navigate within the structure or lot.

Generally, navigation systems provide navigation instructions that navigate a vehicle from a starting address associated with a location of a building, point of interest or other structure to a destination address associated with another location of a building, point of interest or other structure. These navigations system, however, do not provide navigation instructions within the structure or lot and do not account for the traffic flow within the structure or lot.

Accordingly, there is a need for a system and a method for navigating within the structure or lot and accounting for the traffic flow, delays and/or obstructions met when entering or exiting a structure or lot.

SUMMARY

In general, one aspect of the subject matter described in this disclosure may be embodied in an event navigation system. The event navigation system includes a sensor configured to monitor traffic flow within a first structure. The event navigation system includes a memory configured to store a map of the first structure. The event navigation system includes a processor coupled to the sensor and the memory. The processor is configured to obtain a current location of a user and a destination location for the user. The processor is configured to determine a route from the current location to the destination location based on the map of the first structure, the current location, the destination location and the traffic flow within the first structure. The processor is configured to provide the route to the user.

These and other embodiments may optionally include one or more of the following features. The traffic flow may be pedestrian traffic flow and the first structure may be a building where an event is held. The processor may be an electronic control unit of a vehicle and the first structure may be a parking structure. The map may include a layout of each level of the parking structure and one or more entrances and exits of the parking structure. The traffic flow may be vehicle traffic flow. The vehicle traffic flow may include a location of one or more vehicles, a direction of travel of the one or more vehicles and/or a rate or speed of the one or more vehicles within the parking structure.

The processor may be configured to obtain event information including a date, time or type of event. The processor may be configured to determine the traffic flow within the first structure based on the event information and may determine an optimal time to leave for the destination location from the current location based on the traffic flow. The processor may be configured to determine one or more user preferences and may determine the optimal time based on the one or more user preferences.

The memory may be configured to store a map of a second structure. The second structure may be different than the first structure. The current location of the user may be within the first structure and the destination location may be within the second structure. The processor may be configured to determine the route further based on the map of the second structure.

In another aspect, the subject matter may be embodied in an event navigation system. The event navigation system includes multiple personal devices configured to provide multiple locations of the multiple personal devices. The event navigation system includes a memory. The memory is configured to store a map of a first structure. The event navigation system includes a processor coupled to the multiple personal devices and the memory. The processor is configured to obtain a current location of a user and a destination location for the user. The processor is configured to determine a traffic flow within the first structure based on the locations of the personal devices. The processor is configured to determine a route from the current location to the destination location based on the map of the first structure, the current location, the destination location and the traffic flow within the first structure. The processor is configured to provide the route to the user.

In another aspect, the subject matter may be embodied in a method. The method includes obtaining, by a processor, a starting location of a user and a destination location of the user. The method includes determining, by the processor, that the user is at an event based on the starting location of the user. The method includes obtaining, by the processor, a traffic pattern model that models multiple traffic flows throughout a duration of the event. The method includes determining, by the processor, a time to leave the event based on the traffic pattern model. The method includes determining, by the processor, a route from the starting location to the destination location based on the time to leave the event and the traffic pattern model. The method includes providing, by the processor, navigation instructions including the route to the user.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for navigating large events. Particular embodiments of the subject matter described in this disclosure may be implemented to realize one or more of the following advantages. The event navigation system monitors traffic flow, such as vehicle traffic flow and/or pedestrian traffic flow, at large events and determines various patterns and/or relationships associated with the traffic flow, the category or type of event, date or time of the event, and/or other factors related to the event and/or the number of people at the event. The event navigation system uses the patterns and/or relationships along with current sensor data that includes traffic flow or other constraints to determine navigation instructions to the user. The navigation instructions may include a time of when the user should traverse a route (or "optimal time") and the route that the user should traverse to enter or exit the structure or lot where the event is occurring (or "optimal path"). The route may include a direction of travel throughout the passageways of each level or floor of the structure along with the entrance and/or exit to utilize to enter or exit the structure. This provides the user an optimal path and an optimal time to enter and/or leave the event to minimize the amount of time in traffic within the structure or the lot.

For example, the event navigation system may inform the user to leave 10 minutes before an event ends so that the user does not encounter traffic when exiting the parking structure where the user's vehicle is parked. In another example, the event navigation system may inform the user to remain at the event for an extra half hour and exit through the east exit, instead of leaving when the event ends through the south exit, which may reduce the amount of time that the user has to spend in traffic to exit the parking structure.

Other benefits and advantages include the capability to account for numerous factors, such as when the user is attending the event with other family members or a child or the score of the event. The numerous factors may affect the overall time to traverse a route, and thus, the event navigation system would account for these factors when determining the optimal path and/or the optimal time to enter and/or leave the event. For example, when the user is traveling with a child, the rate at which user travels may be slower and the child may not be able to stay awake until the end of the event, and so, both factors may affect the optimal time and/or the optimal path to leave an event. In another example, when the score is lopsided for one team at a sporting event, the traffic flow may ramp up earlier in the sporting event than when the score is close, and so, the optimal time and/or the optimal path to leave may be different.

Figure 1:
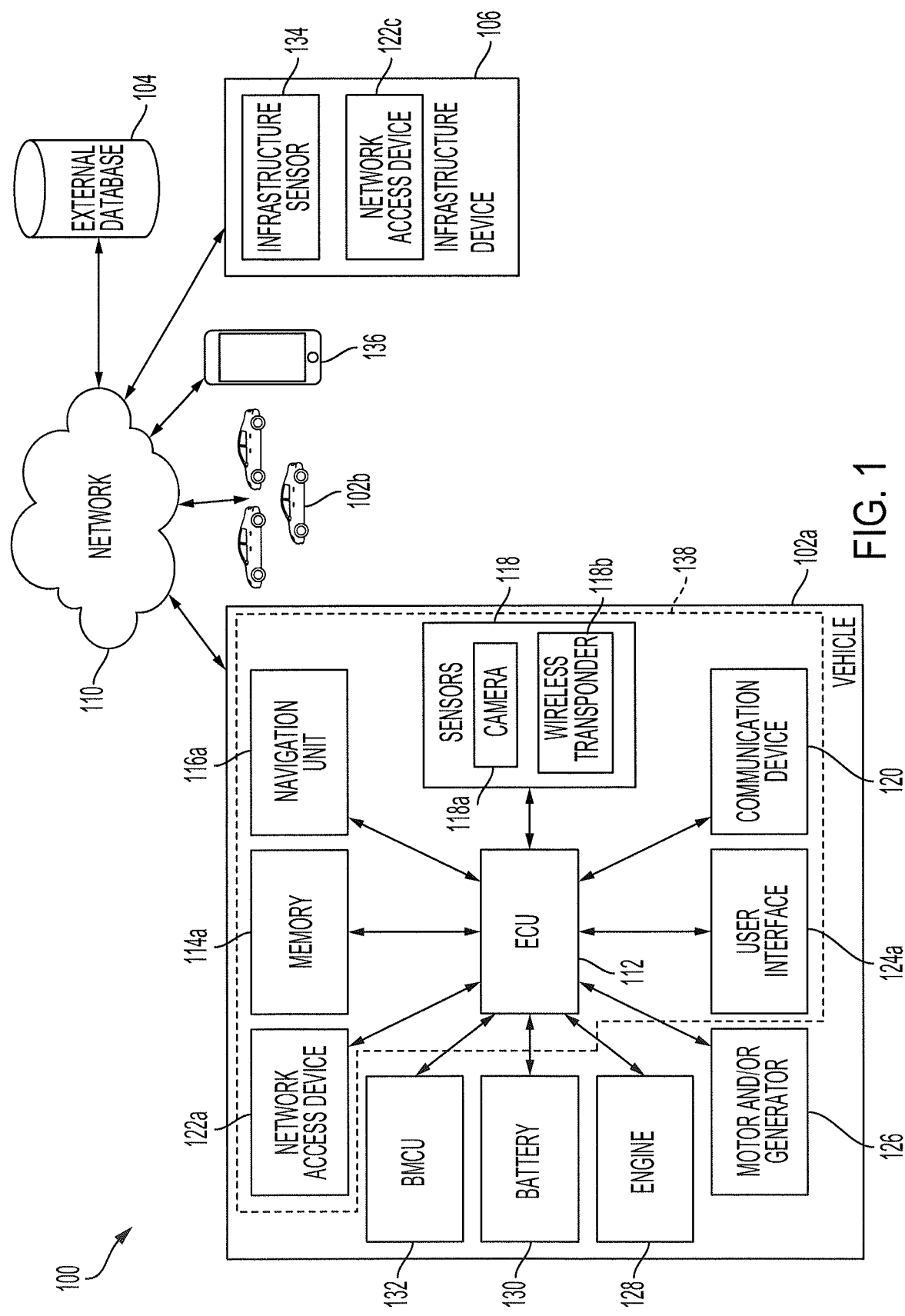
FIG. 1 is a block diagram of an example event navigation system according to an aspect of the invention.

FIG. 1 is a block diagram of an event navigation system 100. The event navigation system 100 may be retro-fitted, coupled to, include or be included within a vehicle 102a. The event navigation system 100 may couple, connect to, or include one or more other devices or entities, such as an external database 104, an infrastructure device 106, another vehicle 102b and/or a user device 136, such as a smartphone, a tablet, a personal computer, a wearable device or other personal computing device. The infrastructure device 106 may be a building, structure or lot entrance and/or exit, a support beam or other object positioned to monitor traffic flow, either pedestrian or vehicle traffic flow, within the building, structure or lot. Traffic flow may refer to the location of one or more vehicles or persons, the direction of travel of the one or more vehicles or persons and a rate or speed of the one or more vehicles or persons. In some implementations, the one or more other devices for the entities are included within the event navigation system 100 and are part of the event navigation system 100.

The event navigation system 100 may have a network 110 that links the multiple entities to share information. The network 110 may be a Dedicated Short-Range Communication (DSRC) network, a local area network (LAN), a wide area network (WAN), a cellular network, the Internet, or combination thereof, that connects, couples and/or otherwise communicates among the multiple entities.

The event navigation system 100 collects, detects and determines various parameters, such as the density of traffic of the vehicles 102a-b and/or people, the location of the vehicles 102a-b, users or other individuals, direction of travel of the vehicles 102a-b, user or other individuals, event information and/or available entrances and/or exits, which may affect or influence when a user leaves to or from an event and the route the user navigates within a structure.

The event navigation system 100 determines an optimal route and an optimal time to exit and/or enter or otherwise navigate at a large event. The optimal route maps a path between two or more locations that start within or end within one or more structures and may require the least amount of time to traverse while satisfying one or more constraints, such as user preferences. The optimal time may be the time to exit or enter the large event that results in the least amount of time to traverse the path while satisfying one or more constraints. Thus, the event navigation system 100 may assist the user to enter or exit and/or otherwise navigate structures within or surrounding large events.

The event navigation system 100 may include or be retro-fitted or otherwise coupled with or coupled to one or more vehicles 102a-b. A vehicle 102a-b is a conveyance capable of transporting a person, an object, or a permanently or temporarily affixed apparatus. The vehicle 102a-b may be a self-propelled wheeled conveyance, such as a car, sports utility vehicle, truck, bus, van or other motor, battery or fuel cell driven vehicle. For example, the vehicle 102a-b may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102a-b may be semi-autonomous or autonomous.

Figure 2:
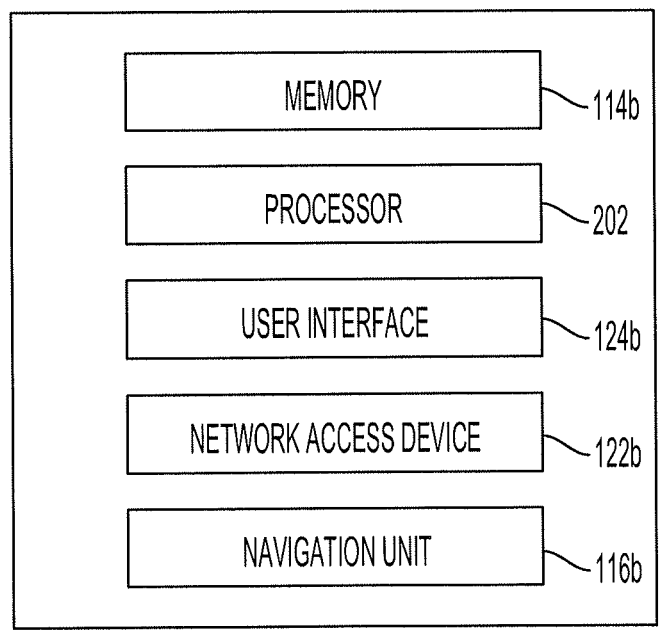
FIG. 2 is a block diagram of an example personal device of the event navigation system of FIG. 1 according to an aspect of the invention.

The event navigation system 100 may have a vehicle navigation apparatus 138 within one or more vehicles 102a-b. The vehicle navigation apparatus 138 may be within, coupled to or otherwise connected to the vehicle 102a-b and/or connected to other vehicle components. The vehicle navigation apparatus 138 and user device 136 may include one or more processors, such as an electronic control unit (ECU) 112 or the processor 202, as shown in FIG. 2 for example, and a memory 114a-b. The vehicle navigation apparatus 138 may include other components, such as a navigation unit 116a, one or more vehicle sensors 118, a communication device 120, a network access device 122a and/or a user interface 124a. The vehicle navigation apparatus 138 may couple, connect to, and/or include one or more vehicle components such as the motor and/or generator 126, the engine 128, the battery 130, and/or the battery management control unit (BMCU) 132.

The ECU 112 may be implemented as a single ECU or as multiple ECUs. The ECU 112 may be electrically coupled to some or all of the other components within the vehicle 102a-b, such as the motor and/or generator 126, the engine 128, the battery 130, the battery management control unit (BMCU) 132, the memory 114a, the network access device 122a and/or one or more vehicle sensors 118. The ECU 112 may include one or more processors or controllers specifically designed for sensing, detecting, measuring and/or otherwise determining or obtaining the various parameters that impact determining the optimal path and/or optimal time to exit or enter a structure, building or lot (hereinafter, "structure") that is hosting a large event. The ECU 112 may be coupled to a memory 114a and execute instructions that are stored on the memory 114a.

Similarly, the processor 202 may be implemented as a single processor or as multiple processors. The processor 202 may include one or more processors or controllers specifically designed for sensing, detecting, measuring and/or otherwise determining or obtaining the various parameters that impact determining the optimal path and/or optimal time to exit or enter a structure, building or lot (hereinafter, "structure") that is hosting a large event. The processor 202 may be coupled to the memory 114b.

The memory 114a may be coupled to the ECU 112 and store instructions that the ECU 112 executes. Similarly, the memory 114b may be coupled to the processor 202 and store instructions that the processor 202 executes. The one or more memories 114a-b may include one or more of a Random Access Memory (RAM) or other volatile or non-volatile memory. The one or more memories 114a-b may be a non-transitory memory or a data storage device, such as a hard disk drive, a solid-state disk drive, a hybrid disk drive, or other appropriate data storage, and may further store machine-readable instructions, which may be loaded and executed by the ECU 112 or processor 202, respectively.

The vehicle navigation apparatus 138 and/or the user device 136 may each include a user interface 124a-b, respectively. The event navigation system 100 may display one or more notifications, alerts and/or the optimal path or the optimal time to enter or leave the event on the one or more user interfaces 124a-b. The one or more notifications on the user interfaces 124a-b may notify or suggest to the user or driver the optimal time to enter or exit the event and the optimal path from the current location of the user or driver to a destination location, such as an exit or entrance of the structure and/or the seat of the of the user. The one or more notifications may alert the user of the optimal time to leave the event and/or alert the driver that the entrance or exit to the structure is closed. The user interfaces 124a-b may include an input/output device that receives user input, such as a user interface element, a button, a dial, a microphone, a keyboard, or a touch screen, and/or provides output, such as a display, a speaker, an audio and/or visual indicator, or a refreshable braille display. The user interfaces 124a-b may receive user input that may include configuration settings for one or more user preferences, for example.

The event navigation system 100 may include one or more network access devices 122a-c. For example, the vehicle navigation apparatus 138 within the one or more vehicles 102a-b includes a network access device 122a, the user device 136 includes a network access device 122b and the infrastructure device 106 may include a network device 122c. The network access devices 122a-c may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access devices 122a-c may transmit data to and receive data from other entities, such as the infrastructure device 106, the external database 104 and/or the vehicles 102a-b.

The vehicle navigation apparatus 138 may include a communication device 120. The communication device 120 may include vehicle-to-infrastructure (V2I) communication that communicates with an infrastructure device 106. The communication device 120 may include vehicle-to-vehicle (V2V) communication that communicates with another vehicle 102b that is in proximity to the vehicle 102a. The communication device 120 communicates V2I and/or V2V to obtain the different parameters that may identify traffic or obstacles that affect the optimal path to enter or exit the structure.

The vehicle navigation apparatus 138 may include a navigation unit 116a and the user device 136 may include a navigation unit 116b. The navigation unit 116a may be integral to the vehicle 102a-b or a separate unit coupled to the vehicle 102a-b, such as the navigation unit 116b of the user device 136. The navigation unit 116b may communicate with the vehicle 102a-b via the network access devices 122a-b. In some implementations, the vehicle 102a-b may include a Global Positioning System (GPS) unit (not shown) for detecting location data and date/time information instead of the navigation unit 116a. In that regard, the ECU 112 or the processor 202 may perform the functions of the navigation unit 116a-b based on data received from the GPS unit. At least one of the navigation unit 116a-b, the ECU 112 or the processor 202 may predict or propose a route set that includes a starting location and a destination location. The navigation unit 116a-b, the ECU 112 or the processor 202 may perform navigation functions. Navigation functions may include, for example, route and route set prediction, providing navigation instructions, and receiving user input such as verification of predicted routes and route sets or destinations.

The navigation units 116a-b may provide and obtain navigational map information. The navigational map information may include a current location, a starting location, a destination location and/or a route between the starting location or current location and the destination location of the vehicle 102a-b or the user device 136, respectively, and may include a memory (not shown) for storing route data. The navigation unit 116a-b may receive data from other sensors capable of detecting data corresponding to location information. For example, the other sensors may include a gyroscope or an accelerometer.

The vehicle navigation apparatus 138 may include one or more vehicle sensors 118 including a camera 118a or wireless transponder 118b, which may capture image data or connect with an infrastructure device 106, respectively, to provide locations of the vehicles 102a-b and/or users, which may be used to determine traffic density and/or traffic flow within the structure. For example, when a wireless transponder 118b connects with the infrastructure device 106, the event navigation system 100 may determine the number of connections, i.e., the number of vehicles 102a-b and/or users, and the location of each connection, i.e., the location of the vehicles 102a-b and/or users. Thus, the wireless transponder 118b may be used to monitor connections and/or disconnections with an infrastructure sensor 134 to localize the locations of the vehicles 102a-b. In some implementations, the network access device 122a may perform the functions of the wireless transponder 118b and/or may be the same device as the wireless transponder 118b.

Similarly, the one or more vehicle sensors 118 may include a global positioning system (GPS) or use the navigation unit 116a-b to provide the locations of the vehicles 102a-b so that the traffic flow and/or traffic density may be determined. The event navigation system 100 may also use the image data captured from the camera 118a to determine obstacles, such as a closed entrance or exit, along with the traffic density and/or traffic flow.

The event navigation system 100 may couple, connect to, and/or include one or more vehicle components. The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. In some implementations, the vehicle 102a-b may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 132 may be coupled to the battery 130 and may control and manage the charging and discharging of the battery 130. The BMCU 132, for example, may measure, using battery sensors, parameters used to determine the state of charge (SOC) of the battery 130. The BMCU 132 may control the battery 130 to maintain a reserve power explicitly for providing a sudden burst of electrical energy to be converted into power for the transmission to drive or move the multiple wheels of the vehicles 102a-b.

The event navigation system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a map database that has maps of one or more structures. The maps may include information, such as the location of entrances and/or exits, the location of parking spots, and the layout of the passageway, halls, stairs, and/or roadway of various levels of the structures. The layout may include specific traffic flow plans for the structure during an event that includes the exits or entrances that are blocked or otherwise closed before, after or during an event and the timing of when the exits or entrances are blocked or otherwise closed.

The external database 104 may store and/or provide event information including a location of the event, a starting time, an estimated ending time, and/or attendance information including the number of people and/or parties attending the event and their corresponding seat location within the structure. The event information may include inferred data, such as an expected number of no-shows of people who purchased tickets but eventually do not attend and/or anticipated traffic flow within the structure before, after and during a similar event or at a same or similar structure where the event is held. The event information may be gathered from multiple sources and a baseline model may be generated or formed based on the gathered information from the multiple sources using the event navigation system 100. The event navigation system 100 may then use the baseline model to assist in determining an optimal path and/or an optimal time of entrance or exit.

In some implementations, the external database 104 may store and/or provide weather information including the temperature and any amount or type of participation. The weather information may be used along with the event information to determine an optimal time to leave an event or enter an event. For example, when the weather is about to rain or shower at an event that is not held indoors, the event navigation system 100 may suggest that the user leave earlier to avoid the rain or to avoid the additional traffic that may result from the rain.

The event navigation system 100 may include or be coupled to one or more infrastructure devices 106. The one or more infrastructure devices 106 may be positioned on an entrance or exit, on the ceiling or walls, on a pole or otherwise within or throughout the structure. The one or more infrastructure devices 106 may form a geofence around the structure, which may be used to detect the locations of the one or more vehicles 102a-b and/or the locations of the one or more user devices 136. When the one or more vehicles 102a-b and/or the one or more user devices 136 traverse the geofence, the event navigation system 100 may log an entrance or an exit of the one or more vehicles 102a-b and/or the one or more user devices 136 so that the traffic flow within the structure may be monitored. The infrastructure device 106 may have an infrastructure sensor 134 and/or a network access device 122c. The infrastructure device 106 may use the infrastructure sensor 134 to detect, measure or otherwise determine the traffic flow and/or traffic density for vehicles and/or pedestrians, such as when one or more vehicles 102a-b cross the geofence to enter and/or exit the structure. The infrastructure sensor 134 may be a wireless transponder, a camera, a proximity sensor, radar, lidar or other sensor that is capable of capturing data to determine traffic flow and/or density. For example, the infrastructure sensor 134 may be a camera and capture image data, which may be analyzed to determine the traffic density or traffic flow within the structure. In another example, the infrastructure sensor 134 may be a global positioning system (GPS) device that provides the location of the vehicle 102a-b and/or user such that the locations of the vehicles 102a-b and/or users may be aggregated to determine the traffic flow and/or density. Similarly, wireless transponders, using Bluetooth or other wireless protocol may track connections of wireless devices throughout the structure to determine the locations of the vehicles 102a-b and/or the users.

The event navigation system 100 may include or be coupled to one or more other vehicles 102a-b. The event navigation system 100 may use the communication device 120 to communicate among the vehicles 102a-b to obtain vehicle data including the location of the other vehicles 102*a-b*. The vehicle data may include other sensor data obtained from the one or more other vehicles 102*a-b*, such as traffic density or image data. The vehicle 102*b* may include the vehicle navigation apparatus 138, the one or more vehicle components and other similar components that perform similar functions as the vehicle 102*a*.

Figure 3:
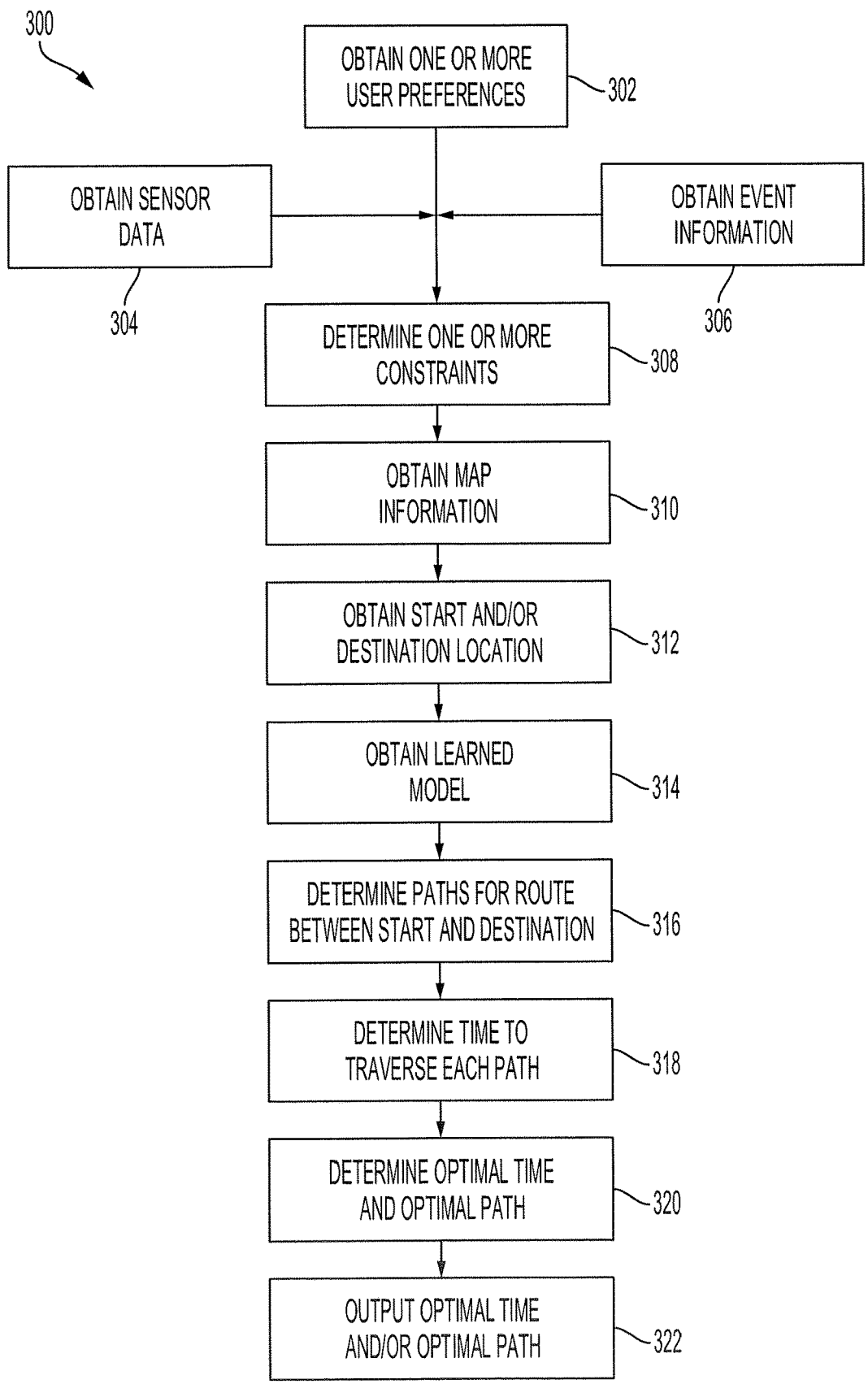
FIG. 3 is a flow diagram of an example process for providing an optimal path and an optimal time to enter and/or exit or otherwise navigate an event using the event navigation system of FIG. 1 according to an aspect of the invention.

FIG. 3 is a flow diagram of a process 300 for determining and outputting an optimal path and/or an optimal time to exit, enter or otherwise navigate an event. One or more computers or one or more data processing apparatuses, for example, the ECU 112 of the vehicle navigation apparatus 138 and/or the processor 202 of the user device 136 of the event navigation system 100, appropriately programmed, may implement the process 300.

The event navigation system 100 obtains one or more user preferences (302). The vehicle navigation apparatus 138 and/or the user device 136 may receive the one or more user preferences from user input via the one or more user interfaces 124*a-b*. For example, the user may provide user input that specifies the amount of time or the relative amount of time that the user wishes to leave or enter the structure relative to the start or end time.

The one or more user preferences may indicate a preference or circumstance of the user, which would result or cause the user to leave or enter an event earlier or later and/or take longer or take less time to enter or exit the event. For example, the one or more user preferences may indicate that the user desires to enter a movie theater earlier than a normally scheduled start time for the movie to watch the previews or to leave later to watch any teasers in the end credits of the movie. In another example, the one or more user preferences may indicate that a child accompanied the user, and thus, the user and the child must return home before a certain time or may take longer to traverse a route to enter or exit a structure. In another example, the one or more user preferences may indicate that the user does not wish to wait in traffic for more than approximately 20 minutes.

In some implementations, the one or more user preferences may be learned. For example, the event navigation system 100 may use a camera 118*a* to capture image data, which is analyzed to determine that the child accompanied the user. In another example, the event navigation system 100 may scan an email to identify that when tickets were purchased for the event the user bought one or more tickets for a child, and so, the event navigation system 100 may determine that the child accompanied the user. In another example, the event navigation system 100 may store a difference in time when the user exits or enters an event relative to the end or start time and determine whether the user prefers to enter or leave earlier or later relative to the start and end time of events based one the history of the difference in times of the previous user patterns.

The event navigation system 100 may obtain sensor data (304). The event navigation system 100 may obtain the sensor data from one or more of the infrastructure sensors 134, the user device 136 and/or the one or more vehicle sensors 118 on the vehicles 102*a-b*. The sensor data may include the location of one or more vehicles 102*a-b*, an amount or number of vehicles 102*a-b* within the vicinity of the infrastructure, such as the entrance or exit of the structure, and/or the location of one or more user devices 136. The event navigation system 100 may aggregate or collect locations of the one or more vehicles 102*a-b* and/or locations of the one or more user devices 136 to determine the direction and/or speed of the one or more vehicles 102*a-b* or persons along with the traffic density and/or the amount or number of persons or vehicles 102*a-b* at the locations.

For example, an infrastructure sensor 134 may be placed at each entrance and/or exit of a structure. The infrastructure sensor 134 may monitor the vehicles 102*a-b* that enter and/or exit the structure at each of the entrances and/or exits and the rate at which the vehicles 102*a-b* enter and/or exit the structure. The infrastructure sensor 134 may count the number of vehicles 102*a-b* that enter, exit and/or in proximity to the entrance and/or exit and the rate at which the vehicles 102*a-b* enter or exit. This allows the event navigation system 100 to monitor the availability of the entrance and/or exit along with the traffic density and traffic flow in proximity to the entrance and/or exit. By monitoring the amount or number of vehicles 102*a-b* and the rate of the traffic flow in proximity to the entrance and/or exit, the event navigation system 100 may determine the amount of wait time that is required before a vehicle 102*a-b* passes through the entrance or exit.

In another example, the infrastructure device 106 may have a wireless transponder or use the network access device 122*c* to emit a wireless signal. The infrastructure device 106 may emit the wireless signal and track connections and/or disconnections of the one or more vehicles 102*a-b* or the one or more user devices 136 within the structure to identify the location of the one or more vehicles 102*a-b* and/or the one or more user devices 136. This allows the event navigation system 100 to track traffic flow and/or rate within the structure.

In another example, the infrastructure device 106 or the one or more vehicle sensors 118 may provide sensor data that indicates that a vehicle 102*a-b* has exited the structure. The sensor data may indicate the origin or location of the parking space that the vehicle 102*a-b* was previously parked, such as by tracking the wireless signal. This allows the event navigation system 100 to provide the location of the parking space that is likely now unused to another vehicle 102*a-b* which is entering or within the structure.

The sensor data may also include estimated wait times for various services offered at the event. For example, the event may have a waiting area for a ride-sharing service, and so, the sensor data may include information regarding the wait time for the vehicle 102*a-b* to arrive at the ride-sharing pickup location if multiple vehicles are queued or waiting to enter or exit the ride-sharing pickup area. The event navigation system 100 may use the estimated wait times when suggesting an optimal path or an optimal time to leave the event when the user did not arrive in a vehicle 102*a*.

The event navigation system 100 may obtain event information (306). The event information may include the type or category of an event, such as a rock, pop or other concert, a baseball game, a basketball game or other sporting event, a speech, a musical, a play or other theatrical performance, and/or other large event. The event information may include the scheduled and/or estimated start and/or end times, the size of the attendance, and/or anticipated traffic flow, which may indicate when people in attendance enter or leave the event.

The event navigation system 100 may obtain the name and location of the event that the user is attending and provide the name and the location of the event to an external database 104, such as an event database, which tracks and stores the event information. The event navigation system 100 may obtain the name and location via user input and/or learn the name and location from a receipt, email or other purchase confirmation of the event, e.g., stored on a calendar or within an email. In response, the event database may provide the event information to the event navigation system 100.

The event navigation system 100 may determine one or more constraints (308). A constraint may represent a requirement of the user, such as that the user desires to avoid waiting more than 5 minutes to exit a structure or is accompanied by a child, which restricts or lessens the rate at which the user travels to and/or from their vehicle. The one or more constraints may be based on the one or more user preferences. For example, if the one or more user preferences indicate that the user does not wish to wait in traffic more than a threshold amount, the event navigation system 100 may determine that one constraint is that the traffic at an exit must flow at a certain rate such that the user may exit the structure is less time than the threshold amount. Similarly, if the user is accompanied by a child, the rate of travel to walk to and/or from their vehicle may be less than when the user is alone. Thus, when the event navigation system 100 calculates the optimal time and/or optimal path, the event navigation system 100 accounts for the one or more constraints. In another example, when the one or more user preferences include that the user wants to watch the previews for the movie, the event navigation system 100 may determine that one of the constraints is to plan an optimal path and/or optimal time to reach the user's seat 15 minutes prior to the estimated start time of the movie so that the user may watch the previews.

The event navigation system 100 obtains map information of one or more structures (310). The event navigation system 100 may provide the location of the event to an external database 104, such as a city planning database, and in response, associate the location of the event with one or more structures that are within a threshold distance and obtain the map information of the one or more structures. For example, when the event navigation system 100 provides an address or coordinates of the location of the event, such as 600 Town Center Dr., Costa Mesa, Ca 92626, the city planning database may recognize the building as the "ABC Center for the Arts" and provide the map information for the building of the "ABC Center for the Arts." Moreover, the city planning database may recognize that the nearest parking structure is at 602 Anton Blvd., Costa Mesa, Ca 92626 and the nearest parking lot is located at 3333 Bristol St. Costa Mesa, Ca 92626, and provide the map information for the parking structure and parking lot.

The one or more structures that correspond to the structure holding the event may be learned. Upon collection of the sensor data, the event navigation system 100 may determine the one or more structures based on the start and end locations of users that attended previous events held at the structure where the event is being held. Thus, the event navigation system 100 may intuitively or inferentially determine the one or more structures that may be associated with the event and request the map information for those one or more structures in addition to the map information of the structure where the event is held.

The map information for the structure where the event is held may include the location of the seats, entrances, exits, elevators, passageways, stairways, halls, public and/or restricted areas and/or other areas of each level or floor of the structure where a person traverses or otherwise resides during the event. The map information for the structure of one or more parking structures that correspond to the event may include the location of one or more entrances and/or exits along with the locations of the parking spots or thoroughfares within the parking structure where the vehicle traverses or otherwise parks during the event. In general, the map information may include a layout of each level or floor of the structure, the entrances and/or exits of the structure, and/or any thoroughfares or passageways that allow for a transportation means to navigate through each level or floor of the structure.

The event navigation system 100 determines or obtains a start location and/or a destination or end location ("destination location") for the user, the vehicle 102a and/or a combination of both (312). The event navigation system 100 may receive user input on the one or more user interfaces 124a-b that indicate the start location and/or the destination location.

In some implementations, the event navigation system 100 may infer the start location and/or the destination location. The event navigation system 100 may determine the start and end times of the event using the current time. When the current time is closer to the start time, the event navigation system 100 may infer that the user and/or vehicle 102a intends to enter the structure of the event and proceed to the seat of the user. The event navigation system 100 may obtain the seat location from a receipt, email or other confirmation of the purchase of the event and locate the seat within the structure using the map information for the structure associated with the event. The event navigation system 100 may assign the current location of the user and/or vehicle to the start location and the location of the seat as the destination location. The event navigation system 100 may use one or more of the navigation units 116a-b to obtain a current location of the user and/or the vehicle 102a, respectively. In some implementations, the event navigation system 100 may infer an intermediary location between the start location and the destination location, such as a parking place for the vehicle 102a-b. The event navigation system 100 may suggest an open parking space as the intermediary location. The event navigation system 100 may determine or infer the start location, the destination location and/or the intermediary location based on the sensor data.

When the current time is closer to the end time, the event navigation system 100 may infer that the user and/or vehicle 102a intends to exit the structure of the event. The event navigation system 100 may assign the current location of the user or the location of the seat of the user as the start location and the exit of the structure where the event is held or the corresponding structure where the vehicle 102a is located as the destination location. The entrances and/or exits of the structure may be determined using the map information associated with the one or more structures.

The event navigation system 100 may track one or more intermediary locations between the start location and/or the destination location when the user enters the event. The event navigation system 100 may determine the one or more intermediary locations based on when the location of the user device 136 diverges from the location of the vehicle 102a and the location of the vehicle 102a remains at the same location. This may indicate that the vehicle 102a has parked and that the user has left the vehicle 102a to enter the structure where the event is being held.

Figure 4:
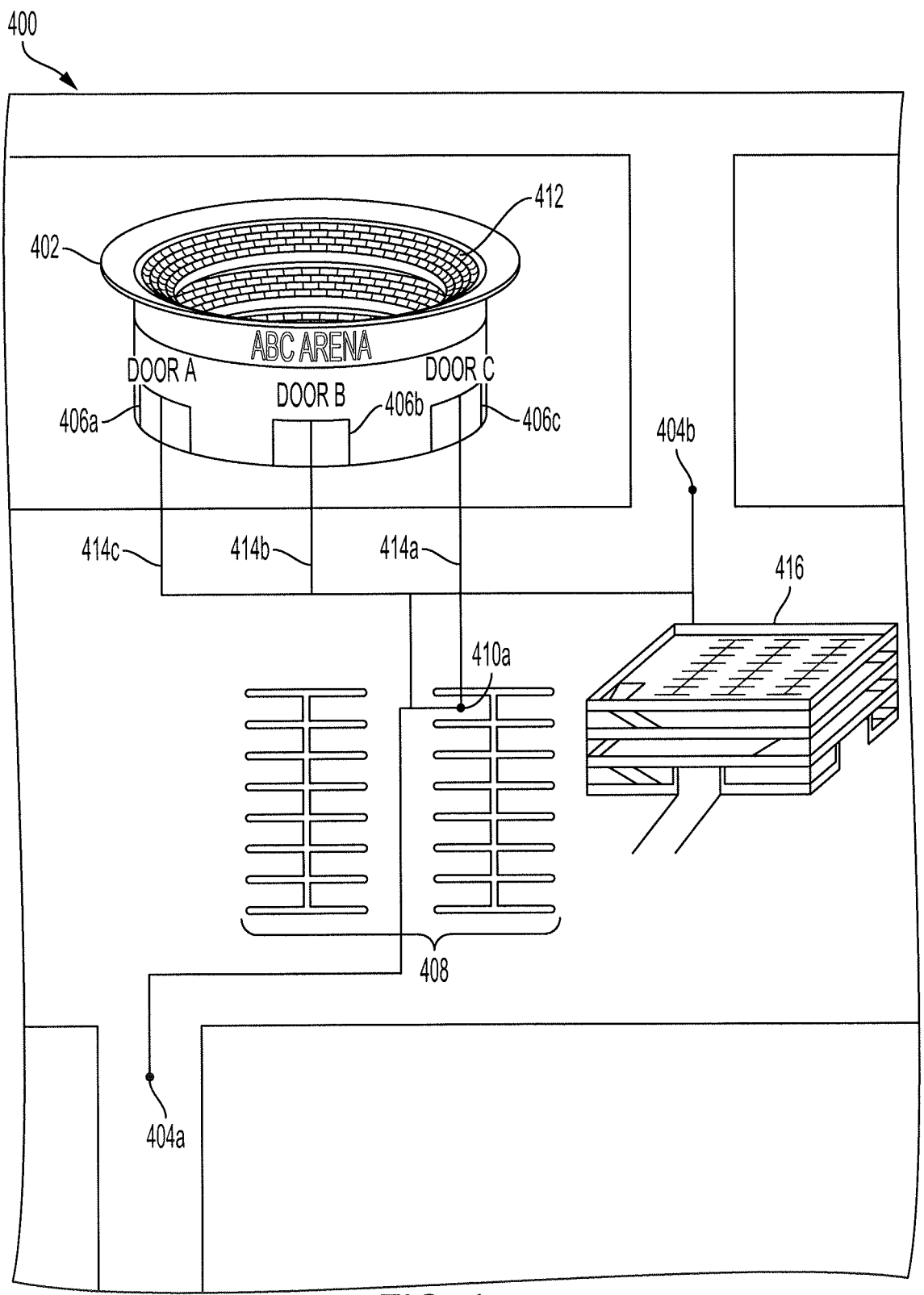
FIG. 4 shows an example of different paths that the event navigation system of FIG. 1 may suggest as an optimal path entering or exiting an event according to an aspect of the invention.

The event navigation system 100 may determine the one or more intermediary locations between the start location and the destination location that the user traversed to reach their destination. For example, when the user is leaving the event, the user may need to exit the structure holding the event, enter the parking structure to retrieve their vehicle 102a and exit the parking structure onto the public street. Thus, the user must first travel to the location of the vehicle 102a after exiting the structure holding the event, and then, exit the parking structure. FIG. 4 further describes possible paths of the user when entering or leaving an event.

The event navigation system 100 may obtain a learned model (314). The learned model may be generated from the sensor data collected before, after and/or during previous events. The event navigation system 100 may provide the event information to an external database 104 and obtain a learned model based on the category or type of event and the one or more structures that correspond or are related to the event. The learned model may be of other events that are in a same or related category as the event, such as basketball games, and/or were held in the same or similar structures, such as the same or similar basketball arena and corresponding parking structure and/or lot. For example, an event such as a concert whose prior performances were held at different locations may provide data on the length of the performance of the prior events and/or traffic patterns before, after or during the prior events. Different types of event may have different learned models because the traffic flows and/or rates will be different, and thus, the event navigation system 100 is able to provide more accurate navigation instructions because the learned model may be tailored to a specific category.

The learned model may provide a model or representation of a typical traffic flow or rate during, before or after the event for the one or more structures. The typical traffic flow or rate may be mapped to each of one or more map entities, such as passageways, exits or entrances, stairways or other map entities, provided within the map information. For example, the learned model may describe the traffic flow and/or rates through one or more entrances or exits from various seating areas of the arena at a time during the event, such as the fourth quarter of a basketball game. In another example, the learned model may describe the traffic flow through a stairway or passageway to the restroom during the last intermission of a concert that is held at a concert hall.

The traffic flow and/or rates may indicate when the traffic flow increases or ramps up and/or when the traffic flow decreases or ramps down for different map entities. The learned model may correlate these changes in the traffic flow and/or rates to situations or circumstances within the event, such as when certain songs are sung, the difference in score in a sporting event, and/or the estimated time that the event will end. Thus, the event navigation system 100 may use the learned model to predict traffic flows and rates more accurately at the event and at various times throughout the event.

In some implementations, the learned model may be based on other factors. The other factors may include the date, the time and/or the surrounding location of where the event is held. For example, an event held on a Saturday night may have a different traffic flow than an event held on a Monday night because the crowds will be different, the crowds may stay out longer on the Saturday night and/or may otherwise behave differently because of the different date or time of day.

The event navigation system 100 may determine multiple potential paths between the start location, destination location and/or one or more intermediary locations to determine the optimal path (316). The event navigation system 100 determines the multiple potential paths using map information for the one or more structures associated with the event. The event navigation system 100 determines which passageways, thoroughfares, entrances/exits or other entities within the map information are traversable before, during or after the event and plots the path or route from the start location to the destination location through the one or more intermediary locations based on the traversable entities. Moreover, the event navigation system 100 may extract from the learned model the paths or routes that have been used previously to navigate between the start location and the destination location to determine the multiple potential paths that are available. For example, if an entrance or exit is blocked based on the event information, the event navigation system 100 may filter or remove all possible paths or routes that use the entrance or exit when determining the multiple paths. Additionally, the event navigation system 100 may eliminate potential paths from the multiple potential paths that deviate from the most direct route a threshold amount to minimize resource computation and/or to eliminate potential paths that do not satisfy one or more user constraints, e.g., the use of only American with Disabilities Act approved thoroughfares if the user is handicapped.

When determining a path from the start location to the destination location through the one or more intermediary locations, the event navigation system 100 accounts for the limitations of the one or more thoroughfares being traversed along with the limitations of the transportation means. The event navigation system 100 may anticipate that the user is walking when the user either leaves the vehicle 102a to enter the structure where the event is held or exits the structure where the event is held to pick up the vehicle 102. When the location of the user device 136 is different than the location of the vehicle 102a, the event navigation system 100 may determine that the user is not inside the vehicle 102a and is or would be walking instead of driving. When the locations are the same, the event navigation system may anticipate that the user is driving.

Once the event navigation system 100 determines the multiple potential paths, the event navigation system 100 may calculate an amount of time to traverse each of the multiple potential paths at the various times before, after or during the event (318). The time that the user leaves the starting location for the destination location may affect the amount of time to traverse the path as the traffic flow between the locations may be different at the various times. Other factors including the one or more user constraints, such as when a child accompanies the user, may affect the amount of time necessary to traverse each of the multiple paths. The event navigation system 100 may extract the start and/or end time of the event from the event information and determine the amount of time necessary to traverse each of the multiple paths at the various times. The various times may include times that are a threshold amount of time before or after the start and/or end time of the event. The threshold amount of time may be reflective of an amount of time a reasonable person would wait after or come early to the event and/or one or more constraints, such as when the entrances and/or exits of the structure are opened to allow for those in attendance to be at the structure holding the event.

The amount of time to traverse each of the multiple potential paths may be based on the traffic flow and/or rates modeled in the learned model and may account for one or more transportation means along the path between the starting location to the destination location through the one or more intermediary locations. The event navigation system may calculate the amount of time by determining the distance travelled for each of the multiple paths and dividing the distance to be travelled by the traffic rate between the starting location, the destination and the one or more intermediary locations.

For example, when the user traverses from their seat to leave the event, the user may travel from their seat to an exit of the structure holding the event. The event navigation system 100 may use traffic flows and/or rates from the learned model that model the pedestrian traffic flow within the structure to determine the amount of time necessary to walk from the seat to the exit. In another example, when the user is in their vehicle 102a and exiting, entering or otherwise traversing through the parking structure, the event navigation system 100 may use traffic flows and/or rates from the learned model that model the vehicle traffic flow within the parking structure or lot to determine the amount of time to drive to or from the entrance or exit of the parking structure.

Once the event navigation system 100 determines the multiple potential paths at the various times and the corresponding amount of time to traverse each of the multiple potential paths at each of the various times, the event navigation system 100 determines the optimal path and/or the optimal time (320). The optimal path is one of the multiple potential paths that minimizes the amount of time necessary to traverse the path. The optimal time represents the time that the user must leave the starting location to travel to the destination location to minimize the amount of time that it takes for the user to travel from the starting location to the destination location on the optimal path. The optimal path and/or optimal time may both need to satisfy one or more constraints, such as the use of an ADA approved route and/or an expected arrival time of 15 minutes before the movie begins so that the user may watch the previews.

The event navigation system 100 may select the path and the corresponding time to traverse the path, as the optimal path and optimal time, respectively, that results in the user traversing the path in the least amount of time, while satisfying the one or more constraints. The path and the time may be selected from the multiple potential paths that were determined at the various times before, after or during the event.

The event navigation system 100 outputs the optimal path and/or the optimal time to the user (322). The event navigation system 100 may display the optimal path and/or the optimal time on the user interface 124a-b on the vehicle 102a or the user device 136, respectively. The event navigation system 100 may display the optimal path and/or the optimal time on the one or more user interfaces 124a-b based on the location of the user and/or the location of the vehicle 102a. When the location of the user and the location of the vehicle 102a are the same or within a threshold distance that indicates that user is within the vehicle 102a, the event navigation system 100 may display the optimal path and/or the optimal time on the user interface 124a within the vehicle 102a. Otherwise, the event navigation system 100 may display the optimal path and/or the optimal time only on the user interface 124b on the user device 136.

FIG. 4 shows various paths that a user may take when exiting or entering an event that is held at an arena 402. When traveling along a roadway, the event navigation system 100 may identify areas where large density of vehicles 102a-b are congregated. The event navigation system 100 may use the location of the vehicles 102a-b obtained from the navigational map information to identify large events based on the density of the vehicles 102a-b in an area, such as near an arena. The event navigation system 100 may suggest a detour to the arena and upon entering the arena area the vehicle 102a-b may need navigation instructions around the structure and surrounding structures. For example, the event navigation system 100 may suggest the route 414a to the user, which starts at the entrance/exit 404a of the parking lot 408, i.e., a starting location. The event navigation system 100 may suggest that the user park the vehicle 102a in the parking spot 410, i.e., an intermediary location, because the parking spot 410a is available and closest to the arena 402, which would minimize the amount of time for the user to walk to the seat 412, i.e., the destination location, through the door 406c. In another example, the event navigation system 100 may suggest the route 414c to the user when entering the arena 402. The event navigation system 100 may suggest that the user enter through the entrance/exit 404b, i.e., starting location, and park the vehicle 102a in the parking structure 416. The event navigation system 100 may determine and suggest an available parking spot, i.e., an intermediary location, within the parking structure 416 that is closest to the arena 402 to minimize the amount of time it takes for the user to arrive at the seat 412, i.e., a destination location. The event navigation system 100 may suggest that the user enter through the door 406a because there may be a significant amount of traffic flow through the doors 406b-c and/or the doors 406b-c may be unavailable.

In another example, the event navigation system 100 may suggest the route 414b to the user when the user exits the arena 402 to minimize the amount of time that the user takes to exit the arena 402. The user may travel from their seat 412, i.e. the starting location, through the door 406b to their vehicle 102a in parking spot 410, i.e. the intermediary location, to pick up their vehicle 102a and exit the arena 402 area via the entrance/exit 404b, i.e., destination location. The various paths may include various paths within the arena 402, within the parking lot 408 and/or within the parking structure 416.

Figure 5:
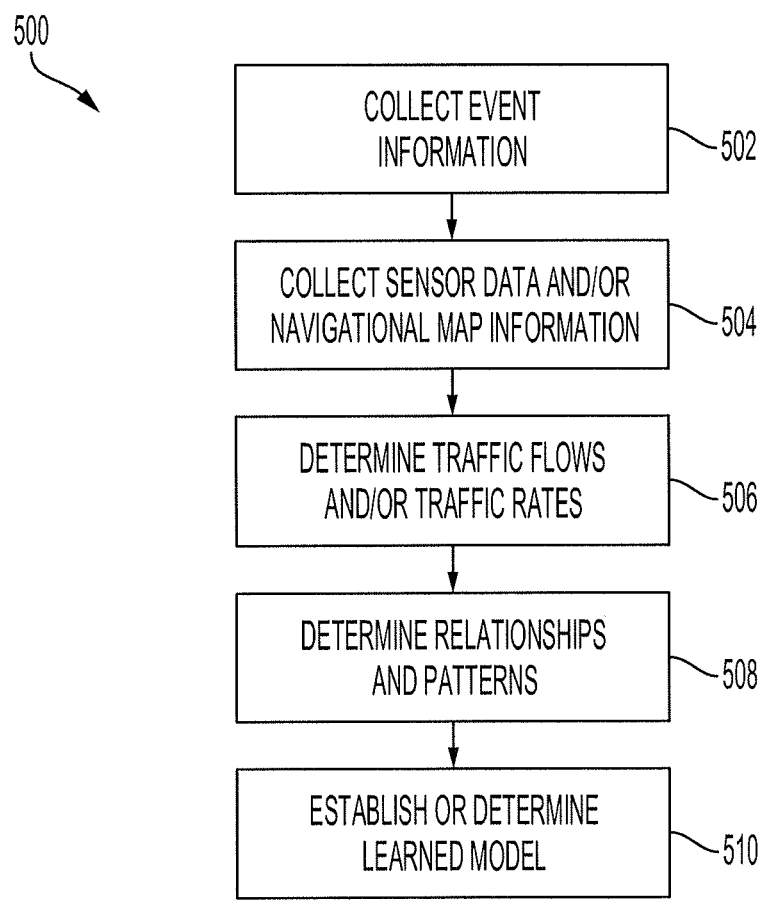
FIG. 5 is a flow diagram of an example process for generating or establishing a learned model using the event navigation system of FIG. 1 according to an aspect of the invention.

FIG. 5 is a flow diagram of an example process 500 for generating, establishing or otherwise determining a learned model. One or more computers or one or more data processing apparatuses, for example, one or more processors of an external database 104 of the event navigation system 100, appropriately programmed, may implement the process 500.

The event navigation system 100 collects event information including start and end times, attendance information, category of the event and other information related to an event (502). The other information may include the type of structures, such as buildings, lots and/or parking structures, that are used by patrons of the event.

The event navigation system 100 may also collect sensor data and/or navigational map information from multiple sources at these different events (504). The multiple sources include the vehicle navigation apparatus 138 of one or more vehicles 102a-b, one or more user devices 136 and/or one or more infrastructure devices 106. The event navigation system 100 may collect, crowd-source or otherwise obtain the sensor data using the one or more vehicle sensors 118 and/or the one or more infrastructure sensors 134. The event navigation system 100 may also collect, crowd-source or otherwise obtain navigational map information including the location of a vehicle 102a-b or a user device 136 from the one or more navigation units 116a-b.

The event navigation system 100 may determine traffic flow and/or rates through entrances, exits and/or passageways or other thoroughfares before, during or after the event (506). The event navigation system 100 tracks the movement of the locations of the user devices 136 and/or the vehicles 102a-b and correlates the collected sensor data and/or navigational map information with the event information, such as the time during the event, to determine the traffic flow and/or rates that correspond with the event or category of similar events.

The event navigation system 100 determines relationships and patterns within the traffic flow and/or rates (508). When a movement, such as direction or rate of traffic flow, of multiple users and/or vehicles 102a-b occurs and/or is repeated a number of times for an event or a similar type of event, the event navigation system 100 may establish that there is a pattern that occurs for the traffic flow for the event or category of the event. The movement of the multiple users and/or vehicles 102a-b may indicate a path that users and/or vehicles use to reach a destination location from a start location and when the multiple users and/or vehicles 102a-b typically leave for the destination location, before, after or during the event.

The event navigation system 100 may identify trends of the location, direction and speed of travel of users and/or vehicles 102a-b through various structures associated with the event before, after and during the event or other event of a similar nature. The various trends may indicate when users exit or enter the structure. For example, the event navigation system 100 may identify that users tend to leave a sporting event earlier and in greater numbers when the difference in the score is greater than a threshold number, whereas, when the score is close, users tend to leave the sporting event later.

In another example, the event navigation system 100 may identify that users who are in attendance of an event may congregate at a restaurant, a bar or other facility when waiting for the vehicle traffic flow to subside so that the user is able to leave the event. And so, when the event navigation system 100 suggests an optimal time to leave the event is a threshold time after the event ends, the event navigation system 100 may also suggest or recommend the restaurant, the bar or other facility for the user to spend their time while waiting. The suggestions may also be based on one or more user preferences. For example, if the user is accompanied by a child, the event navigation system 100 may exclude facilities that are not appropriate for the child because previous users accompanied by a child congregated at a more family-oriented facility, such as an ice cream stand.

Once the patterns are determined, the event navigation system 100 establishes or determines the learned model based on the relationships and patterns (510). When the patterns are repeated or occur in a percentage of the data collected for the event or similar category of event, the event navigation system 100 may determine that the pattern is part of the learned model, which is used to anticipate, predict or otherwise determine an optimal path and/or an optimal time. As the event navigation system 100 collects more sensor data and/or navigational map information, the event navigation system 100 may update the learned model. As the frequency of a pattern increases, the likelihood of inclusion of the pattern within the learned model increases, and as the frequency decreases, the likelihood of inclusion of the pattern within the learned model decreases.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An event navigation system, comprising:
a sensor configured to monitor traffic flow within a first structure;
a memory configured to store a map of the first structure; and
a processor coupled to the sensor and the memory and configured to:
obtain a current location of a user,
obtain a destination location for the user,
generate a learned model to determine a traffic flow within the first structure based on the traffic flow sensed by the sensor and a type of event related to the first structure;
determine a route from the current location to the destination location based on the map of the first structure, the current location, the destination location and the traffic flow within the first structure determined by the learned model, and
provide the route to the user.

2. The event navigation system of claim 1, wherein the traffic flow is pedestrian traffic flow and the first structure is a building where an event is held.

3. The event navigation system of claim 1, wherein the processor is an electronic control unit of a vehicle and the first structure is a parking structure, wherein the map includes a layout of each level of the parking structure and one or more entrances and exits of the parking structure, wherein the traffic flow is vehicle traffic flow, wherein the sensor is further configured to determine that a vehicle has exited the parking structure and a location of an open parking space that was previously occupied by the vehicle, wherein the route includes the location of the open parking space.

4. The event navigation system of claim 3, wherein the vehicle traffic flow includes a location of one or more vehicles, a direction of travel of the one or more vehicles and a rate or speed of the one or more vehicles within the parking structure.

5. The event navigation system of claim 1, wherein the processor is configured to:
obtain event information including a date, time or type of event;
determine the traffic flow within the first structure based on the event information; and
determine an optimal time to leave for the destination location from the current location based on the traffic flow.

6. The event navigation system of claim 5, wherein the processor is configured to:
determine one or more user preferences; and
determine the optimal time based on the one or more user preferences.

7. The event navigation system of claim 1, wherein the memory is configured to store a map of a second structure, wherein the second structure is different than the first structure, wherein the current location of the user is within the first structure and the destination location is within the second structure.

8. The event navigation system of claim 7, wherein the processor is configured to determine the route further based on the map of the second structure.

9. An event navigation system, comprising:
a plurality of personal devices configured to provide a plurality of locations, each of the plurality of personal devices configured to have a location of the plurality of locations;
a memory configured to store a map of a first structure; and
a processor coupled to the plurality of personal devices and the memory and configured to:

obtain a current location of a user,
obtain a destination location for the user,
generate a learned model to determine a traffic flow within the first structure based on the plurality of locations of the plurality of personal devices and a type of event related to the first structure,
determine a route from the current location to the destination location based on the map of the first structure, the current location, the destination location and the traffic flow within the first structure determined by the learned model, and
provide the route to the user.

10. The event navigation system of claim 9, further comprising:
a plurality of sensors configured to monitor the traffic flow within the first structure;
wherein to determine the traffic flow within the first structure includes using the plurality of sensors.

11. The event navigation system of claim 9, wherein the processor is an electronic control unit of a vehicle and the first structure is a parking structure, wherein the map includes a layout of each level of the parking structure and one or more entrances and exits of the parking structure that allow traffic flow, wherein the traffic flow is vehicle traffic flow, wherein the vehicle traffic flow includes a location of one or more vehicles, a direction of travel of the one or more vehicles and a rate or speed of the one or more vehicles within the parking structure.

12. The event navigation system of claim 9, wherein the processor is configured to:
obtain event information including a date, time or type of event to a database;
determine traffic patterns of the traffic flow within the first structure based on the event information;
determine a time to leave for the destination location from the current location based on the traffic patterns of the traffic flow; and
determine the route further based on the traffic patterns and the time to leave for the destination location.

13. The event navigation system of claim 12, wherein the processor is configured to:
determine one or more user preferences; and
determine the time to leave for the destination location from the current location further based the one or more user preferences.

14. The event navigation system of claim 9, wherein the memory is configured to store a map of a second structure, wherein the second structure is different than the first structure, wherein the current location of the user is within the first structure and the destination location is within the second structure.

15. The event navigation system of claim 14, wherein the processor is configured to determine the route further based on the map of the second structure.

16. The event navigation system of claim 9, wherein the learned model is further based on sensor data, the sensor data including at least one of a location of one or more vehicles, an amount of vehicles within a vicinity of the first structure, traffic density, image data, or estimated wait times for services offered at the event.

17. A method, comprising:
obtaining, by a processor, a starting location of a user and a destination location of the user;
determining, by the processor, that the user is at an event based on the starting location of the user;
generating, by the processor, a learned model to determine a vehicle traffic flow and a pedestrian traffic flow associated with the event, wherein the learned model correlates the vehicle traffic flow and the pedestrian traffic flow with circumstances of the event;
determining, by the processor, an optimal time to leave the event based on the pedestrian traffic flow and the vehicle traffic flow;
determining, by the processor, a route from the starting location to the destination location based on the optimal time to leave the event, the pedestrian traffic flow and the vehicle traffic flow; and
providing, by the processor, the route and the optimal time to the user.

18. The method of claim 17, further comprising:
obtaining, by the processor, a map of a first structure associated with the event;
wherein the determining the route is further based on the map of the first structure.

19. The method of claim 18, further comprising:
obtaining, by the processor, a plurality of locations of a plurality of personal devices;
wherein determining the pedestrian traffic flow is based on the plurality of locations of the plurality of personal devices.

20. The method of claim 18, further comprising:
determining one or more user preferences; and
determining the optimal time based on the one or more user preferences.

21. The method of claim 18, further comprising:
obtaining a map of a second structure, wherein the second structure is different than the first structure, wherein the starting location of the user is within the first structure and the destination location is within the second structure;
wherein determining the route is further based on the map of the second structure.

22. The method of claim 17, wherein the circumstances of the event include a timing of certain songs, a difference in a score in a sporting event, or an estimated time that the event will end.

* * * * *